L. G. ROWAND.
ELECTRIC FURNACE.
APPLICATION FILED JUNE 5, 1917.

1,289,056.

Patented Dec. 24, 1918.
3 SHEETS—SHEET 1.

INVENTOR
Lewis G. Rowand
BY
Pennie Davis + Marvin
ATTORNEYS

L. G. ROWAND.
ELECTRIC FURNACE.
APPLICATION FILED JUNE 5, 1917.

1,289,056.

Patented Dec. 24, 1918.
3 SHEETS—SHEET 2.

INVENTOR
Lewis G. Rowand

ATTORNEYS

UNITED STATES PATENT OFFICE.

LEWIS G. ROWAND, OF BROOKLYN, NEW YORK, ASSIGNOR TO NEW JERSEY ZINC COMPANY, OF NEW YORK, N. Y., A CORPORATION OF NEW JERSEY.

ELECTRIC FURNACE.

1,289,056.  Specification of Letters Patent.  Patented Dec. 24, 1918.

Application filed June 5, 1917. Serial No. 172,853.

*To all whom it may concern:*

Be it known that I, LEWIS G. ROWAND, a citizen of the United States, residing in Sea Gate, borough of Brooklyn, county of Kings, and State of New York, have invented certain new and useful Improvements in Electric Furnaces; and I do hereby declare the following to be a full, clear, and exact description of the invention, such as will enable others skilled in the art to which it appertains to make and use the same.

The electric furnace of the present invention is particularly suitable for the reduction of zinc ores and the recovery of spelter therefrom. The furnace is, however, well adapted for the reduction of other ores and for analogous purposes, as, for instance, the driving off of one atom of the sulfur in complex ores of zinc containing iron and sulfur to permit magnetic separation of the iron constituent from the zinc constituent of the ore thus treated.

In the furnace hereinafter described in detail, the charge (say the usual charge of zinc ore and carbon as used in the gas fired zinc retorts of the Belgian furnace) is admitted through an intake opening at the top of a vertical and relatively narrow chamber, and after heat treatment therein, is delivered through a discharge opening at the bottom of the chamber. The heating of the charge is effected by the radiation of heat from electrical conductors of appropriate resistivity lining the walls of the chamber or otherwise suitably disposed therein for the ready transfer of heat to the charge. The quantity of electrical energy delivered to the resistance conductors is so regulated that the charge does not become excessively hot. That is to say, the radiation from the resistors is sufficient to effect the desired changes in the charge, say reduction and volatilization of zinc, but the temperature is kept below what would volatilize any large amount of any less volatile metal or compound, such as iron.

In the reduction of zinc ores and the recovery of spelter therefrom by Belgian furnace practice, the spelter first collected in the condenser is associated with lead, and for that reason is of lower grade than the spelter collected during the middle stage of the operation by which time the lead has been volatilized in large part and, in fact, completely in ores containing but a small percentage of lead. In the final stages of the operation, when the temperature of the retorts and of the charge reach the maximum degree, a certain amount of iron is volatilized and is received in the condenser, and to that extent contaminates the spelter so that the spelter tapped off from the condenser at the final stage of the operation is of lower grade than that tapped off during the intermediate period.

It is an object of the present invention when the furnace is used for the production of spelter by the reduction of zinc ore, to lessen the volatilization of iron and thereby to raise the grade of the final product. In fact, by judicious handling of the furnace, it is possible to practically avoid the volatilization of iron and therefore to obtain pure spelter even from the last stages of the operation.

In accordance with the present invention, conservation of heat is attained by operating the heating chambers in groups; special expedients are resorted to for preventing premature cooling or chilling of the vapors on their way to the condenser; and the resistors are of such construction and shape and are so positioned within the chamber as to secure most efficient action on the charge while resisting in satisfactory manner mechanical erosion and progressive combustion, or other like disintegration.

By the use of the furnace of the present invention, the reduction, or partial reduction, of metals from their ores, oxids, and like compounds, and particularly the reduction of zinc ore and the production of spelter therefrom, may be effected with economy and with relatively large output and under conditions less trying to the workmen than in usual practice.

In the accompanying drawings, which disclose a preferred embodiment of the invention—

Figure 1:
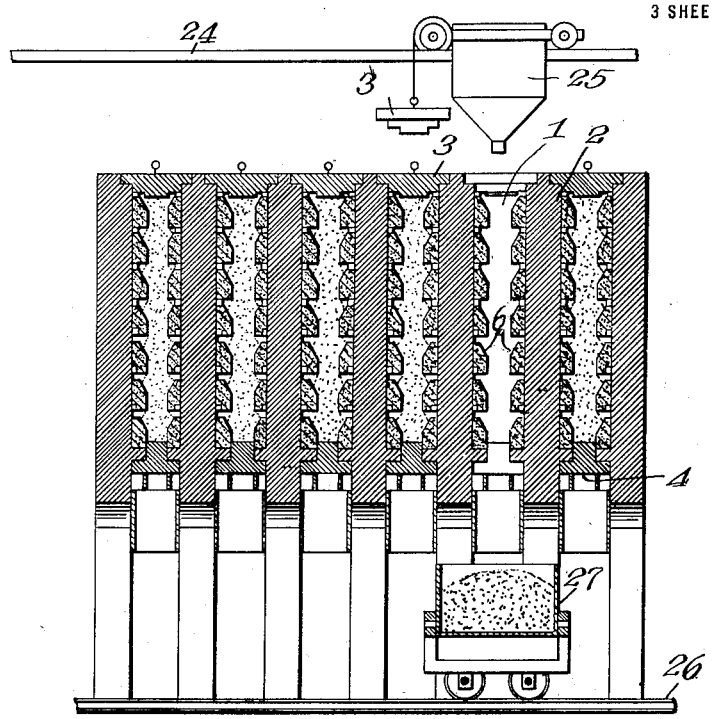
Figure 1 is a sectional elevation of a series of heating chambers constituting a complete furnace.
Figure 2:
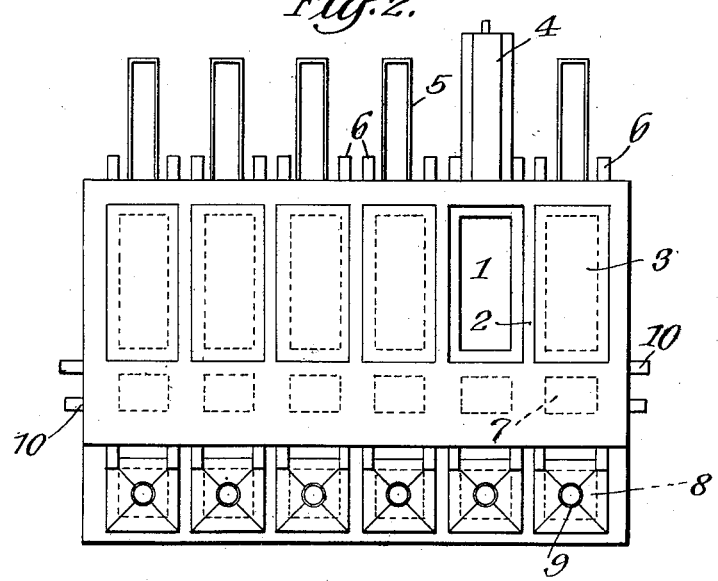
Fig. 2 is a plan view of the same.

The furnace of Fig. 1 has six vertical heating chambers 1, arranged side by side, and each enveloped by a wall 2 of fire brick, or other suitable refractory material. Each of these chambers is preferably of rectangular cross-section, and relatively narrow, and is provided at its top with an intake opening having a removable cover 3, and at its bottom with a discharge opening normally closed by a sliding base 4 which can be pulled out along a bracket 5, or the like, as indicated in Fig. 3, when the residue of the charge is to be dumped from the chamber.

The side walls of each of the furnace chambers are faced or lined with resistors, preferably in the form of bars 6, spaced apart, and sheltering suitable vents or openings through which may escape the vapors arising from the heat treatment. These resistors are preferably made from a non-metallic substance having good heat radiating qualities, and while conductive for electricity, yet affording relatively high resistance to the flow of current. I may employ a mixture of calcined carbonate of magnesium, carbon, and a binder such as molasses, tar, or the like, or I may employ carbon alone, united by a suitable binder or in solid form without a binder, as, for instance, graphite, say Acheson graphite.

At the side of each heating chamber is a vertically disposed flue 7 (Fig. 3) communicating with the heating chamber at different zones or levels through vents hereinafter described more in detail. Each flue 7 leads to a condenser 8 provided with a stack 9, the lower part of which telescopes into the upper part to give access to the condenser for ladling out the spelter, or the like, collecting therein during operation of the furnace.

Figure 3:
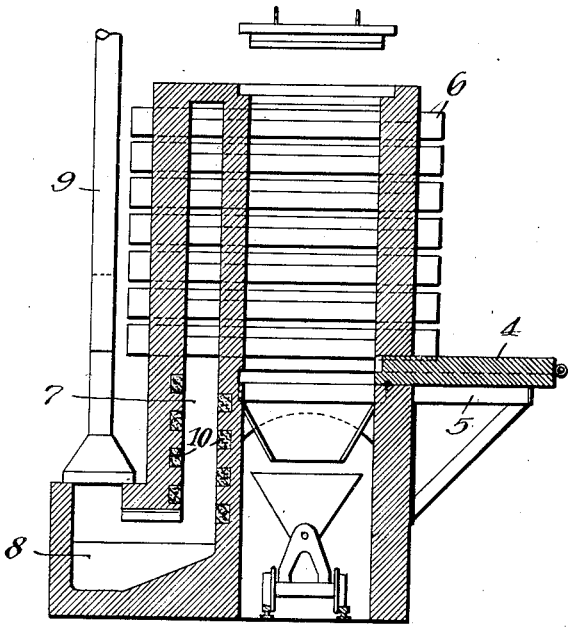
Fig. 3 is a transverse section.

As shown in Fig. 3, the resistors 6 may extend through the flue and thereby serve to convey to the flue enough heat to prevent premature cooling or chilling of vapors discharged thereinto from the heating chamber. The lower part of the flue may be provided with auxiliary heating conductors 10 embedded in the walls thereof, and supplied with electrical energy in suitable manner and quantity to keep this part of the flue at most appropriate temperature.

By allowing resistors 6 to project entirely through the outer walls of the furnace, as disclosed in Fig. 3, their connection with the source or sources of electrical energy is conveniently effected, and by the use of ordinary regulating means, the amount of electrical energy delivered to any one of the conductors may be separately controlled to govern the distribution of heat from top to bottom of the vertical heating chamber, as will be readily understood.

Figure 4:
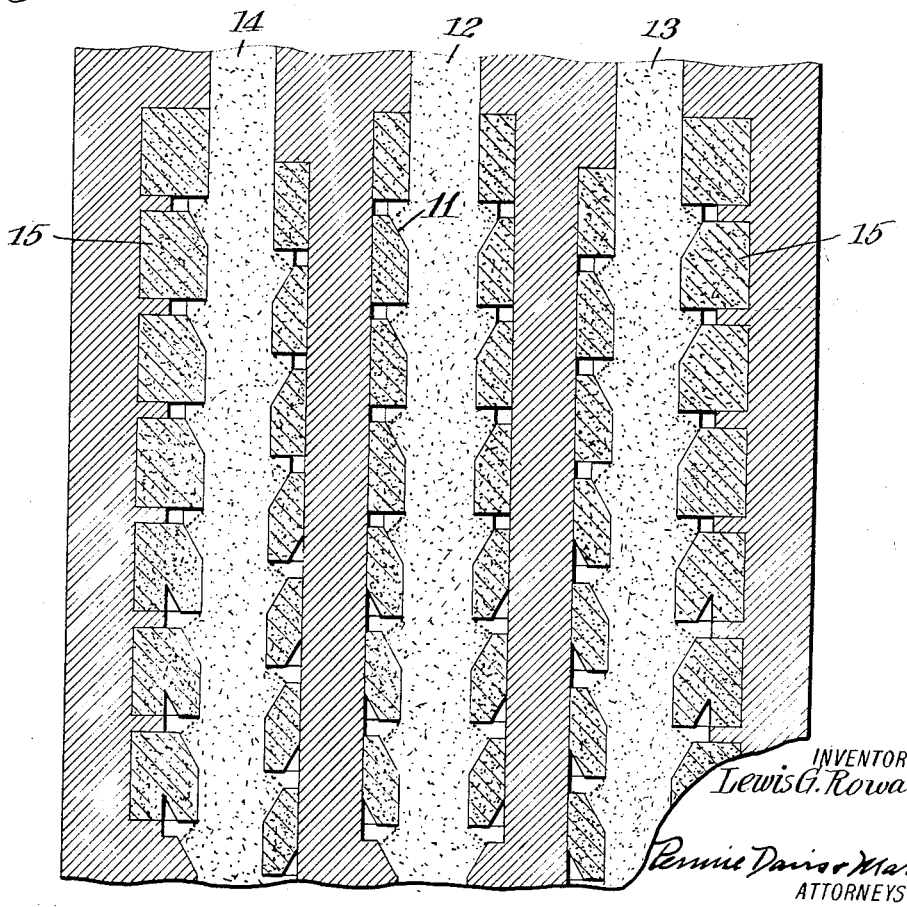
Figs. 4 to 9 are detailed views illustrating various shapes and kinds of resistors and various groupings thereof within the furnace.

Resistors of various shapes suitable for use in this furnace are shown in Figs. 4 to 9, inclusive. In Fig. 4 the resistors are of rectangular cross-section, except that an upper corner 11 is beveled to facilitate downward movement of the charge between opposed pairs of resistors. For the central chamber 12 of this figure the two resistors of each pair are located at the same level, whereas for the two outermost chambers 13 and 14, the resistors of each pair are in staggered relation to give to the charge a somewhat tortuous path during its descent. Also, the outermost resistors 15 of the two outer chambers are set into recesses of the adjacent masonry wall instead of merely being seated against that wall, as in the case of the resistors for the central chamber 12.

Figure 5:
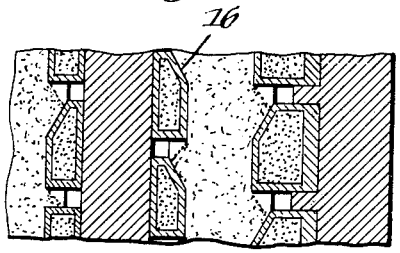

In Fig. 5, each resistor is covered with a refractory envelop 16 to protect it from mechanical wear and from oxidation or other chemical change. This refractory envelop may be of fire clay or other material adapted to withstand the severe conditions within the furnace.

Figure 7:
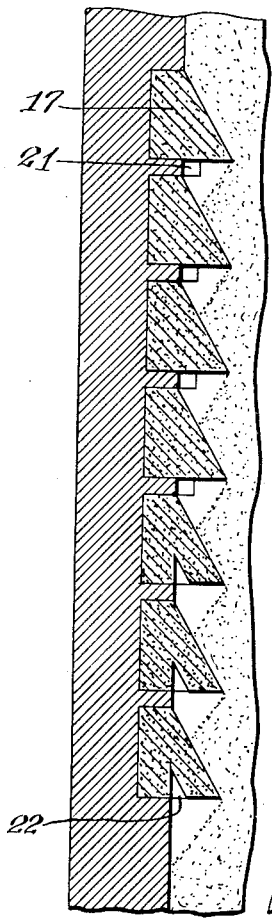
Figure 8:
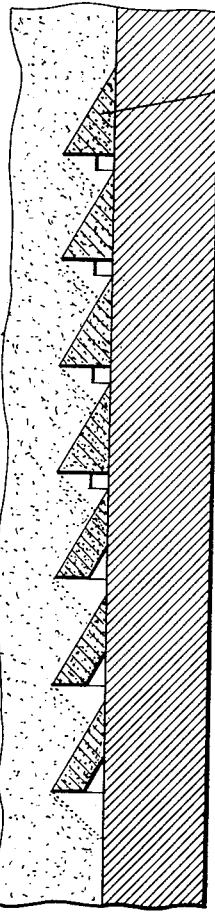

Fig. 7 shows resistors 17 recessed into the furnace wall and beveled off to present only an inclined face to the furnace charge. In Fig. 8 the resistors 18 are similarly beveled but are not set into the walls.

Figure 6:
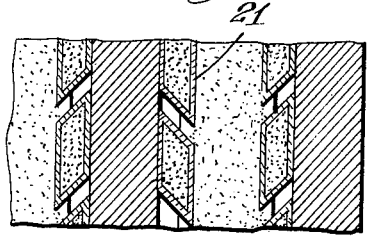
Figure 9:
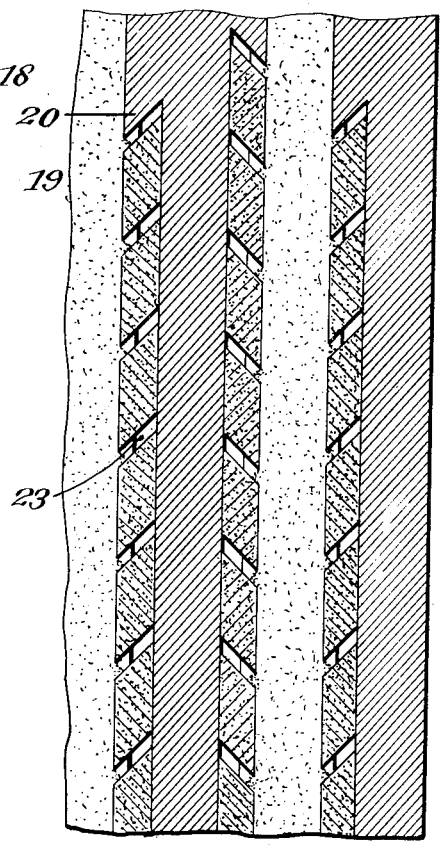

In Fig. 9, the resistors 19 are sheltered beneath an overhanging portion 20 of the furnace wall and are so shaped as to offer small impediment to the downward movement of the furnace charge. Fig. 6 shows these same conductors enveloped in a refractory envelop 21.

When using any of the resistors above described for heating the charge to the reducing or other desired temperature, the resistors are distributed along the wall of the vertical heating chamber and spaced apart to shelter the vents whereby zinc vapor or the like passes out from the heating chamber into flue 7. In Figs. 7 and 8 the upper vents 21 are of rectangular cross-section and formed in the wall of the heating chamber and are kept free from the charge because of the overhang of the resistor immediately above. At the lower part of Figs. 7 and 8 the vents 22 are of triangular cross-section and formed in the resistor itself by cutting a triangular slot longitudinally thereof. In Fig. 9 the vents 23 are formed in the wall of the chamber and are effectively sheltered by the overhang of the adjacent resistor. In general, it is the aim to afford free communication from the heating chamber into the condensing flue through vents adjacent to but sheltered by the resistors, thereby insuring rapid and effective release of vapors, such as the vapor of zinc, but effectively preventing leakage of the unreduced charge from the heating chamber into the condensing flue.

With a plurality of heating chambers constructed and grouped as above described, to form a complete furnace, there may be provided over the furnace a trackway 24 with a hoppered car 25 out of which, after removal of cover 3, the charge may be dropped into the vertical chamber. Similarly, beneath the chambers, there may be arranged a track 26 on which a dump car 27 may be run in beneath any of the chambers to receive therefrom the residue of the charge after bottom plate 4 has been withdrawn, as indicated in Fig. 3.

When producing spelter from zinc ore in this furnace, the amount of carbon present in the charge may be the same as for the usual Belgian furnace practice, or may either exceed or fall below the usual proportion. The advantage of having present a large proportion of carbon is that it lessens the possibility of oxidizing the zinc vapors in the condensers, by binding the maximum amount of oxygen as carbon monoxid, and thereby lessening or practically eliminating the production of carbon dioxid. Where this difficulty is not to be feared, it is of advantage to lessen the proportion of carbon to a practical degree, so as to avoid loss of carbon in the residues from the furnace and also to avoid abnormal heating effects in the furnace due to possible passage of the electrical current through the charge. It is intended that ordinarily the flow of electricity shall be confined to the resistors and shall not pass through the charge. The refractory envelops in which the resistors may be inclosed contribute to this end.

What I claim is:—

1. In an electric furnace for ore reduction, the combination of a vertical heating chamber having an intake opening at the top and a discharge opening at the bottom, electrical resistors placed closely adjacent to each other along the sides of said chamber and by which the ore charge may be heated to reducing temperature, a condenser, and means communicating with said chamber between adjacent resistors for leading condensable vapors from said heating chamber to said condenser.

2. In an electric furnace for ore reduction, the combination of a vertical heating chamber having an intake opening at the top and a discharge opening at the bottom, electrical resistors placed closely adjacent to each other along the sides of said chamber for heating the ore charge to reducing temperature, a condenser, and a flue leading to said condenser and located within the walls of the furnace and communicating with the heating chamber at different levels.

3. In an electric resistance furnace for ore reduction, the combination of a vertical heating chamber having an intake opening at the top and a discharge opening at the bottom, a plurality of separate electrical resistors distributed along the walls of said heating chamber closely adjacent to each other and serviceable to heat the charge to reducing temperature, said chamber having vents between adjacent resistors through which condensable vapors may pass, a condenser, and a flue leading thereto from said vents.

4. In an electric resistance furnace for ore reduction, the combination of a vertical heating chamber having an intake opening at the top and a discharge opening at the bottom, a plurality of electrical resistors distributed along said heating chamber and serviceable to heat the charge to reducing temperature, said chamber having vents at different levels through which condensable vapors may pass, a condenser, and a vertically disposed flue leading thereto from said vents, said resistors being extended through said flue for electrically heating said flue to prevent premature cooling of said vapors.

5. In an electric resistance furnace for ore reduction, the combination of a vertical heating chamber having an intake opening at the top and a discharge opening at the bottom, and a plurality of electrical resistors lining the sides of said heating chamber, each of said resistors having an inclined face, and said chamber having vents sheltered by said resistors, a condenser, and a flue leading thereto from said vents, said resistors being extended through said flue for electrically heating said flue to prevent premature cooling of the vapors delivered from the heating chamber through said vents and passing through said flue to said condenser.

6. In an electrical resistance furnace for ore reduction, the combination of a vertical heating chamber having an intake opening at the top and a discharge opening at the bottom and removable closures for said top and bottom openings, a plurality of electrical resistors spaced apart and lining the sides of said heating chamber, a condenser, and a flue disposed at one side of said heating chamber and communicating therewith at different levels through vents in a wall of said chamber, said vents being sheltered by said resistors and said resistors being so disposed as to heat the upper part of said flue.

7. In an electrical resistance furnace for ore reduction, the combination of a narrow vertical heating chamber having an intake opening at the top and a discharge opening at the bottom and removable closures for said top and bottom openings, and a plurality of resistors of carbonaceous material spaced apart and lining the sides of said heating chamber, each of said resistors having an inclined face and a refractory envelop, a condenser, and a flue vertically disposed at one side of said heating chamber and communicating therewith at different levels through vents in the walls of said chamber, said vents being sheltered by said resistors and said resistors being extended through the upper part of said flue to heat the same; substantially as described.

8. In an electric resistance furnace for ore reduction, the combination of a narrow vertical heating chamber having an intake opening at the top and a discharge opening at the bottom and removable closures for said top and bottom openings, a plurality of electrical resistors of carbonaceous material spaced apart and lining the sides of said heating chamber, each of said resistors having an inclined face and a refractory envelop, a condenser having a stack telescoping to give access to the condenser, a flue vertically disposed at one side of said heating chamber and communicating therewith at different levels through vents in a wall of said chamber, said vents being sheltered by said resistors and said resistors being so disposed as to heat the upper part of said flue, and auxiliary resistors embedded in the walls of said flue near the condenser to prevent premature cooling of the vapors delivered from the heating chamber through said vents and passing down said flue to said condenser.

9. An electric furnace for ore reduction, comprising in combination a series of vertical heating chambers arranged side by side in heat interchanging relation and each having an intake opening at the top and a discharge opening at the bottom, means movable over the tops of said chambers to deliver a charge to each as desired, means movable beneath said chambers to receive material discharged therefrom, electrical resistors in each chamber to heat the charge to reducing temperature, said chambers having vents through which condensable vapors are delivered, a condenser for each heating chamber and a vertical and electrically heated flue leading to each condenser and communicating with its heating chamber through said vents.

10. An electric furnace for ore reduction, comprising in combination a series of vertical heating chambers arranged side by side in heat interchanging relation and each having an intake opening at the top and a discharge opening at the bottom, means movable over the tops of said chambers to deliver a charge to each as desired, means movable beneath said chambers to receive material discharged therefrom, electrical resistors for heating said charges to reducing temperature, said chambers having vents through which condensable vapors are delivered, and condensing means for receiving and condensing said vapors.

11. An electric furnace for ore reduction, comprising in combination a series of vertical heating chambers arranged side by side in heat interchanging relation and each having an intake opening at the top and a discharge opening at the bottom, a removable closure for each intake opening, a movable closure for each discharging opening, a hopper movable over the tops of said chambers to deliver a charge to each as desired, means movable beneath said chambers to receive material discharged therefrom, electrical resistors for heating the charge in each chamber to reducing temperature, said chambers having vents through which condensable vapors are delivered, and condensing means for receiving and condensing said vapors.

12. An electric furnace for ore reduction, comprising in combination a series of narrow vertical rectangular heating chambers arranged side by side in heat interchanging relation and each having an intake opening at the top and a discharge opening at the bottom, a removable closure for each intake opening and a slidingly movable closure for each discharge opening, a hopper movable over the tops of said chambers to deliver a charge to each as desired, a car movable beneath said chambers to receive material discharged therefrom, electrical resistors in each chamber to heat the charge to reducing temperature, said chambers having vents through which condensable vapors are delivered, and condensing means for receiving and condensing said vapors.

13. An electric furnace for ore reduction, comprising in combination a series of narrow vertical rectangular heating chambers arranged side by side in heat interchanging relation and each having an intake opening at the top and a discharge opening at the bottom, a removable closure for each intake opening, a slidingly movable closure for each discharge opening, a hopper movable over the tops of said chambers to deliver a charge to each, as desired, a car movable beneath said chambers to receive material discharged therefrom, electrical resistors in each chamber to heat the charge to reducing temperature, said chambers having vents through which condensable vapors are delivered, and condensing means for receiving and condensing said vapors.

In testimony whereof I affix my signature.

LEWIS G. ROWAND.